United States Patent [19]

Chefalas et al.

[11] Patent Number: 5,287,415
[45] Date of Patent: Feb. 15, 1994

[54] ELASTIC PROTOTYPE AVERAGING IN ONLINE HANDWRITING RECOGNITION

[75] Inventors: Thomas E. Chefalas, Jackson Heights; Charles C. Tappert, Ossining, both of N.Y.

[73] Assignee: International Business Machines Corporation, Armonk, N.Y.

[21] Appl. No.: 782,215

[22] Filed: Oct. 24, 1991

[51] Int. Cl.⁵ .............................................. G06K 9/00
[52] U.S. Cl. ......................................... 382/3; 382/13
[58] Field of Search ................ 382/3, 9, 10, 13, 30, 382/34, 39; G06K 9/00, 9/34, 9/62, 9/68, 9/74

[56] References Cited

U.S. PATENT DOCUMENTS

| | | | |
|---|---|---|---|
| 4,024,500 | 5/1977 | Herbst et al. | 382/13 |
| 4,317,109 | 2/1982 | Odaka et al. | 382/13 |
| 4,718,102 | 1/1988 | Crane et al. | 382/13 |
| 5,040,222 | 8/1991 | Muroya | 382/13 |

Primary Examiner—Jose L. Couso
Attorney, Agent, or Firm—Jack M. Arnold; Marc D. Schechter

[57] ABSTRACT

An elastic-matching alignment technique for providing an averaged prototype in a handwriting recognition system that improves the alignment of parametric representations of recognized characters to be averaged. The point-to-point correspondence resulting from an elastic match of two characters is obtained by using backpointers during the calculation of the match. A character is added to a prototype set if it is new or is not correctly recognized within a fixed threshold. Otherwise, the character is averaged into the closest prototype of its class to provide a new average prototype.

12 Claims, 5 Drawing Sheets

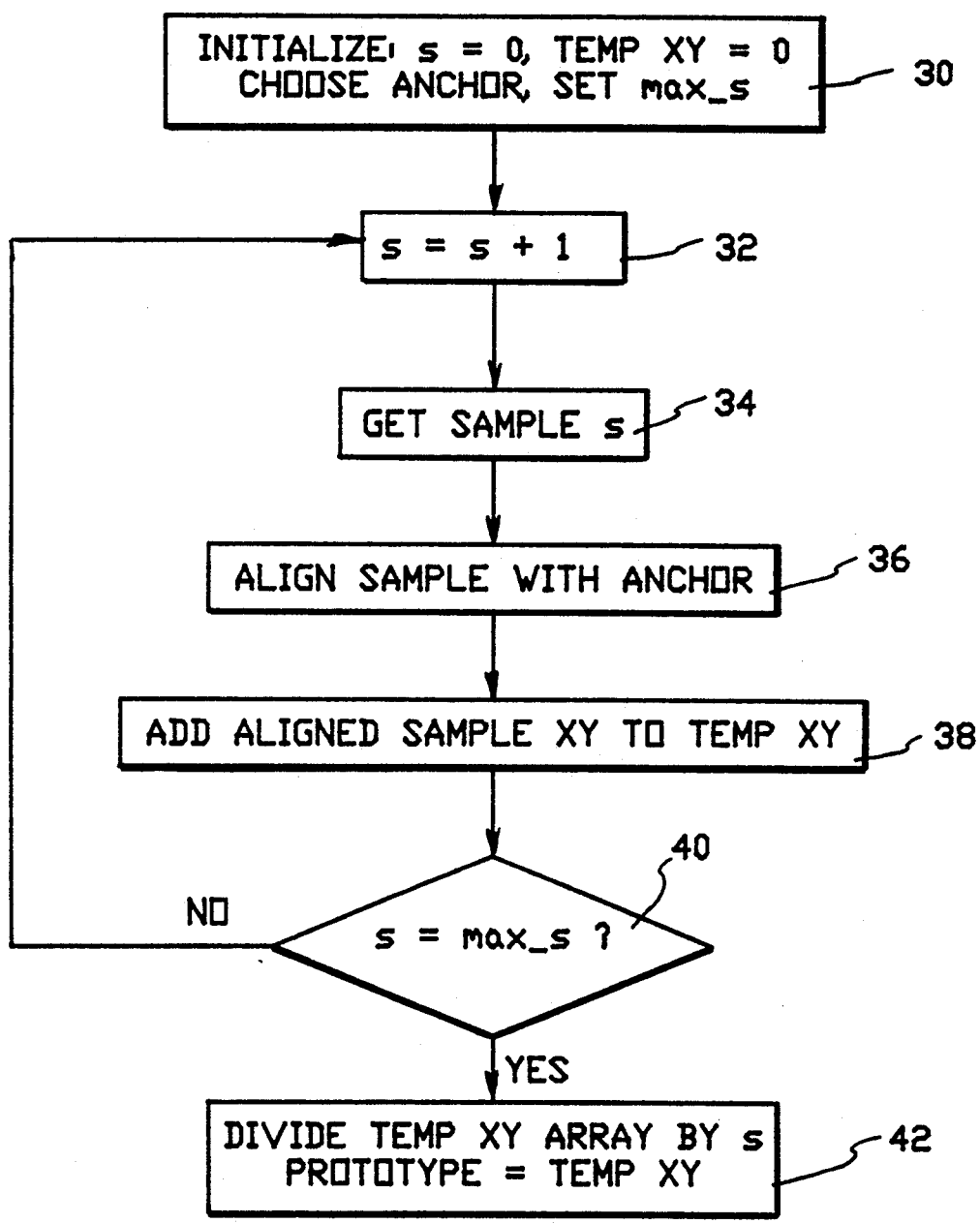

ANCHOR

```
        ANCHOR         SAMPLE
    (X, Y) 1: BACKPOINTER = 1
    (X, Y) 2: BACKPOINTER = 1
    (X, Y) 3: BACKPOINTER = 1
    (X, Y) 4: BACKPOINTER = 2
    (X, Y) 5: BACKPOINTER = 2
    (X, Y) 6: BACKPOINTER = 3
    (X, Y) 7: BACKPOINTER = 3
    (X, Y) 8: BACKPOINTER = 4
    (X, Y) 9: BACKPOINTER = 5
    (X, Y) 10: BACKPOINTER = 5
    (X, Y) 11: BACKPOINTER = 6
    (X, Y) 12: BACKPOINTER = 6
    (X, Y) 13: BACKPOINTER = 7
    (X, Y) 14: BACKPOINTER = 8
    (X, Y) 15: BACKPOINTER = 9
    (X, Y) 16: BACKPOINTER = 10
```

ELASTIC PROTOTYPE AVERAGING IN ONLINE HANDWRITING RECOGNITION

FIELD OF THE INVENTION

The invention is in the field of handwriting recognition, and in particular is directed to an elastic-matching averaging technique. Specifically, the invention is directed to a procedure for improving the alignment of parametric representation of recognized characters to be averaged to produce an average prototype character.

BACKGROUND OF THE INVENTION

Many on-line, handwriting recognition systems employ curve matching methods to match an unknown character against prototype, or template, characters. Examples of such systems are described in the following articles: W. Doster and R. Oed, "Word processing with on-line script recognition", IEEE Micro, Vol. 4, pp. 36–43, October 1984; K. Ikeda, T. Yamamura, Y. Mitamura, S. Fujiwara, Y. Tominaga, and T. Kiyono, "On-line recognition of handwritten characters utilizing positional and stroke vector sequences", Proc. 4th Int. Jt. Conf. Pattern Recognition, pp. 813–815, November 1978; C. C. Tappert, "Adaptive on-line handwriting recognition", Proc. 7th Int. Conf. Pattern Recognition, pp. 1004–1007, 1984; C. C. Tappert, "Speed, accuracy, flexibility trade-offs in on-line character recognition", IBM Research Report RC13228, October 1987; and T. Wakahara and M. Umeda, "Stroke-number and stroke-order free on-line character recognition by selective stroke linkage method", Proc. 4th ICTP, pp. 157–162, 1983. In general, the recognition accuracy of such prototype-based handwriting recognition systems is a function of the quality of the prototypes. Many online, handwriting recognition systems use elastic curve matching to match an unknown character against prototype (template) characters. Examples of such systems are described in the following articles: T. Fujisaki, T. E. Chefalas, J. Kim, and C. C. Tappert, "Online recognizer for runon handprinted characters", Proc. 10th Int. Conf. Pattern Recognition, pp. 450–454, June 1990; K. Ikeda, T. Yamamura, Y. Mitamura, S. Fujiwara, Y. Tominaga, and T. Kiyono, "Online recognition of handwritten characters utilizing positional and stroke vector sequences", Proc. 4th Int. Conf. Pattern Recognition, pp. 813–815, November 1978; C. C. Tappert, "Adaptive online handwriting recognition", Proc. 7th Int. Conf. Pattern Recognition, pp. 1004–1007, 1984. Such systems usually represent each way of writing a character by a single prototype that usually is one writing of the character. This minimizes the number of prototypes and therefore the computation time for matching.

The recognition system of T. Fijisaki et al, above, collects original character prototypes from a user's writing samples through a training scenario. Averaged prototypes are formed by averaging original character prototypes of the same label and shape (within a match threshold). For example, similarly-shaped A's are averaged to yield an averaged A prototype.

An article by T. E. Chefalas and C. C. Tappert, "Improved prototype establishment in a handwriting recognition system", IBM Tech. Disclosure Bulletin, Vol. 33, p. 420, January 1991 describes a technique for global and incremental averaging techniques for online handwriting recognition.

An article by J. M. Kurtzberg and C. C. Tappert, "Symbol Recognition System By Elastic Matching", IBM Tech. Disclosure Bulletin, Vol. 24, No. 6, pp. 2897–2902, November 1981, describes a technique for utilizing elastic matching to recognize symbols.

An article by C. C. Tappert, "Cursive Script Recognition System By Elastic Matching", IBM Tech. Disclosure Bulletin, Vol. 24, No. 11A, pp. 5404–5407 describes a technique for utilizing elastic matching to recognize cursive script.

According to this invention, an elastic-matching (dynamic programming) procedure is not used for recognition as described above, but rather is utilized to improve the alignment of the parametric representation of already recognized characters to be averaged to produce an averaged prototype character. The point-to-point correspondence resulting from an elastic match of two characters is obtained by using backpointers during the calculation of the match. This improved elastic method of alignment is applicable to both global and incremental averaging techniques described above.

DISCLOSURE OF THE INVENTION

An elastic-matching technique for improving the alignment of the parametric representation of characters which are to be averaged to produce an averaged prototype character. The point-to-point correspondence resulting from an elastic match of two characters is obtained by using backpointers during the calculation of the match to produce an averaged character prototype representation of the two characters.

BRIEF DESCRIPTION OF THE DRAWINGS

FIG. 3 is a flow chart indicative of how global averaging is implemented according to the invention;

BEST MODE OF CARRYING OUT THE INVENTION

Figure 1:
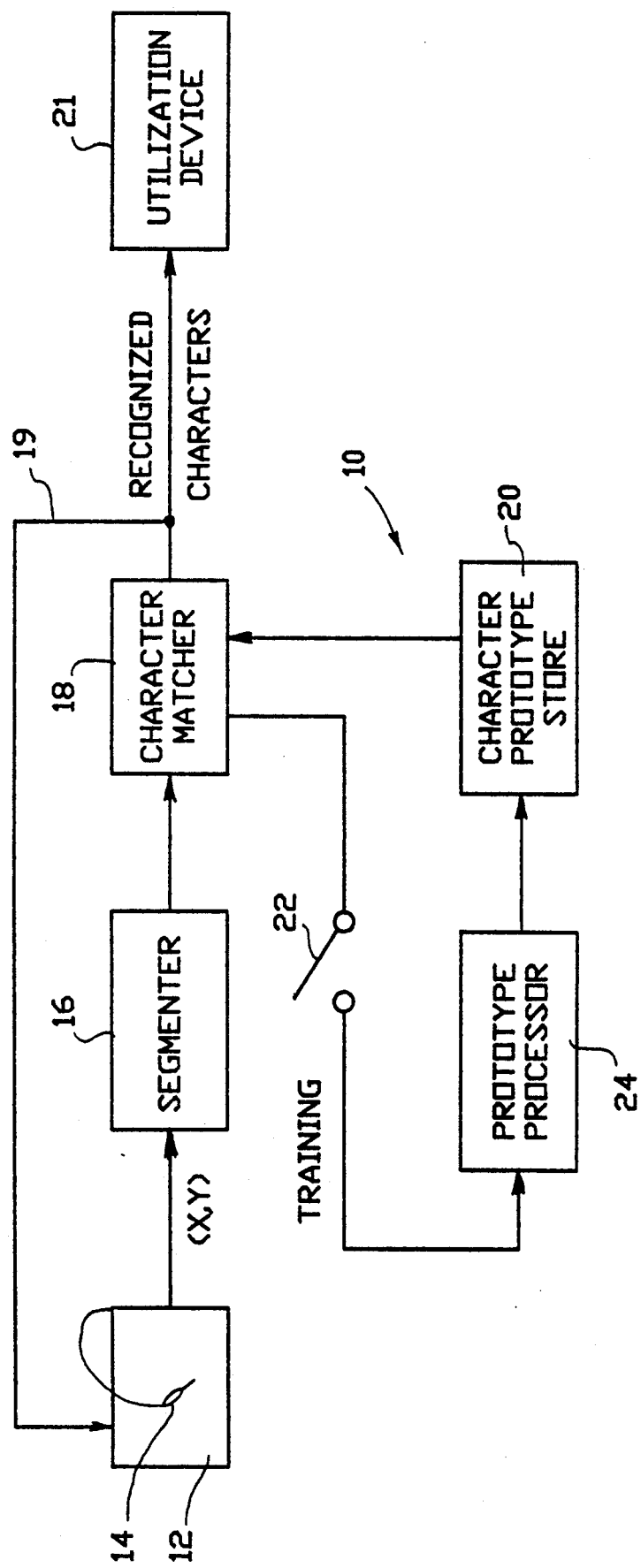
FIG. 1 is a simplified block diagram of a handwriting recognition system constructed and operated in accordance with the invention.
Figures 2A, 2B, 2C, 2D:
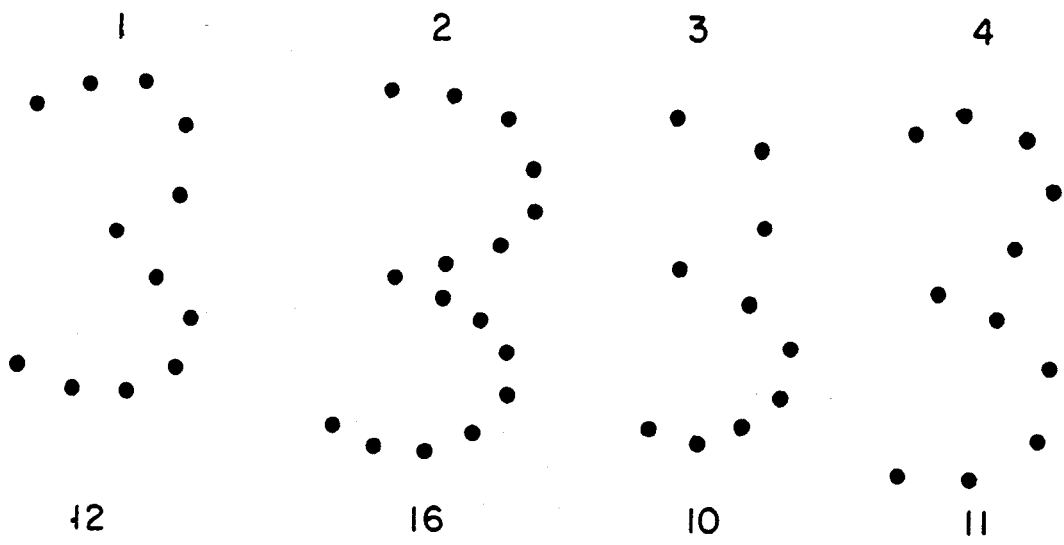
FIGS. 2A–2D show four samples of a character "3", each sample of which has a different number of sample points.

Referring to FIG. 1 there is shown an online handwriting character recognition system 10 constructed and operated in accordance with the invention. System 10 includes a handwriting transducer comprised of an electronic tablet and display 12 having a writing implement, such as a stylus 14. In response to handwritten characters the transducer outputs a serial stream of (x,y) coordinate pairs corresponding to a position of the stylus 14 relative to a tablet 12 coordinate system. The coordinate pairs are provided to a stroke segmenter 16 that identifies a beginning and an end of discrete handwritten strokes. Strokes are provided to a character matcher 18. Character matcher 18 is coupled to a store 20 of predetermined character prototypes for comparing points of input strokes to points of stored character prototypes so as to identify, to within some probability, that an input stroke or assemblage of strokes represents a specific character. Recognized characters are output from the matcher 18 via line 19 to tablet and display 12 to display the recognized characters, or may be applied to a utilization device 21 such as a display, an application, such as a word processing program, or the like. In some systems the functionality of the segmenter 16 and the character matcher 18 may be combined within one handwritten stroke processing unit.

Character prototypes may be provided to the store 20 during a training session held with a user of the system 10. The character prototypes may be entered by a specific user of the system and thereafter used only when the specific user enters handwritten characters. Also, a global or universal set of character prototypes may be generated for use with more than one user.

In this regard a starter prototype set may be designed as an initial prototype set to be used by any writer on first using the system 10. If desired, a writer may then add character prototypes in his/her own writing style to obtain a prototype set tailored to the writer, also referred to as an individualized prototype set. In that a starter prototype set is typically created by an expert in handwriting recognition systems, there is no burden placed on a user of the system 10 to follow any writing suggestions or constraints.

In any case, during a training session characters from character matcher 18 are routed through a physical or logical switch 22 to a prototype processor 24, which for example may be an intel '386 processor. The output of prototype processor 24 is a series of averaged prototype characters that are supplied to store 20 for subsequent use during a handwriting recognition session conducted with a user of the system 10. In accordance with the invention there are provided methods of operating the prototype processor 24 so as to create averaged character prototypes for improving the recognition accuracy. The recognition system of the invention collects original character prototypes from a user's writing samples through a training scenario. Averaged prototypes are formed by averaging original character prototypes of the same label and shape (within a match threshold). For example, similarly-shaped A's are averaged to yield an averaged A prototype which is labeled as A.

The elastic-matching (dynamic programming) procedure of the invention provides the alignment of the parametric representation of characters to be averaged to provide an averaged prototype character. The point-to-point correspondence resulting from an elastic match of two characters is obtained by using backpointers during the calculation of the match. This elastic method of alignment is applicable to both global and incremental averaging techniques known in the prior art. In global averaging, after a large number of characters are written they are processed to form prototypes. In incremental averaging, the prototypes are created "on the fly", that is in real time.

Elastic averaging requires a collection of a user's handwritten characters. Each sample character in the collection contains a stream of X, Y coordinates and a count of the number of coordinates in the stream, as recorded from the digitizing tablet 12 (FIG. 1). This "original" data is processed by a spatial filter to reduce the stream to points that are roughly equally spaced. After filtering, the center of gravity of the X, Y coordinates is calculated and the stream of coordinates is normalized around the center of gravity. FIG. 2A-2D show four samples of the character "3", where each such sample has a different number of sample points.

For global averaging, the set of characters to be averaged is determined as those characters with the same label and shape (within a match threshold). The global averager chooses a particular sample of reference character from this set, referred to as the "anchor", that satisfies a length criterion. Possible length criteria are the sample whose number of points is closest to the average or the sample having the greatest number of points. The anchor is used for alignment in the averaging process. The character in FIG. 2B, for example, is the anchor when the length criterion is the greatest number of points.

Global averaging is performed in prototype processor 24 (FIG. 1) and is flowcharted in FIG. 3. In block 30, the sample to be processed, s, is initialized to zero; the anchor is chosen and max_s is set to the number of samples in the set to be averaged; temporary space (Temp) is created to sum (accumulate) X,Y coordinates and is initialized to all zeros. The size of this space is the number of points in the anchor. Each sample is processed. In block 32, s is incremented. In block 34, the corresponding sample is obtained. The sample is aligned with the anchor in block 36, and the corresponding coordinate-point values are summed in block 38. After all the samples are processed (s=max_s in decision block 40), the sums are divided by the number of samples to obtain the average prototype in block 42.

Figure 4:
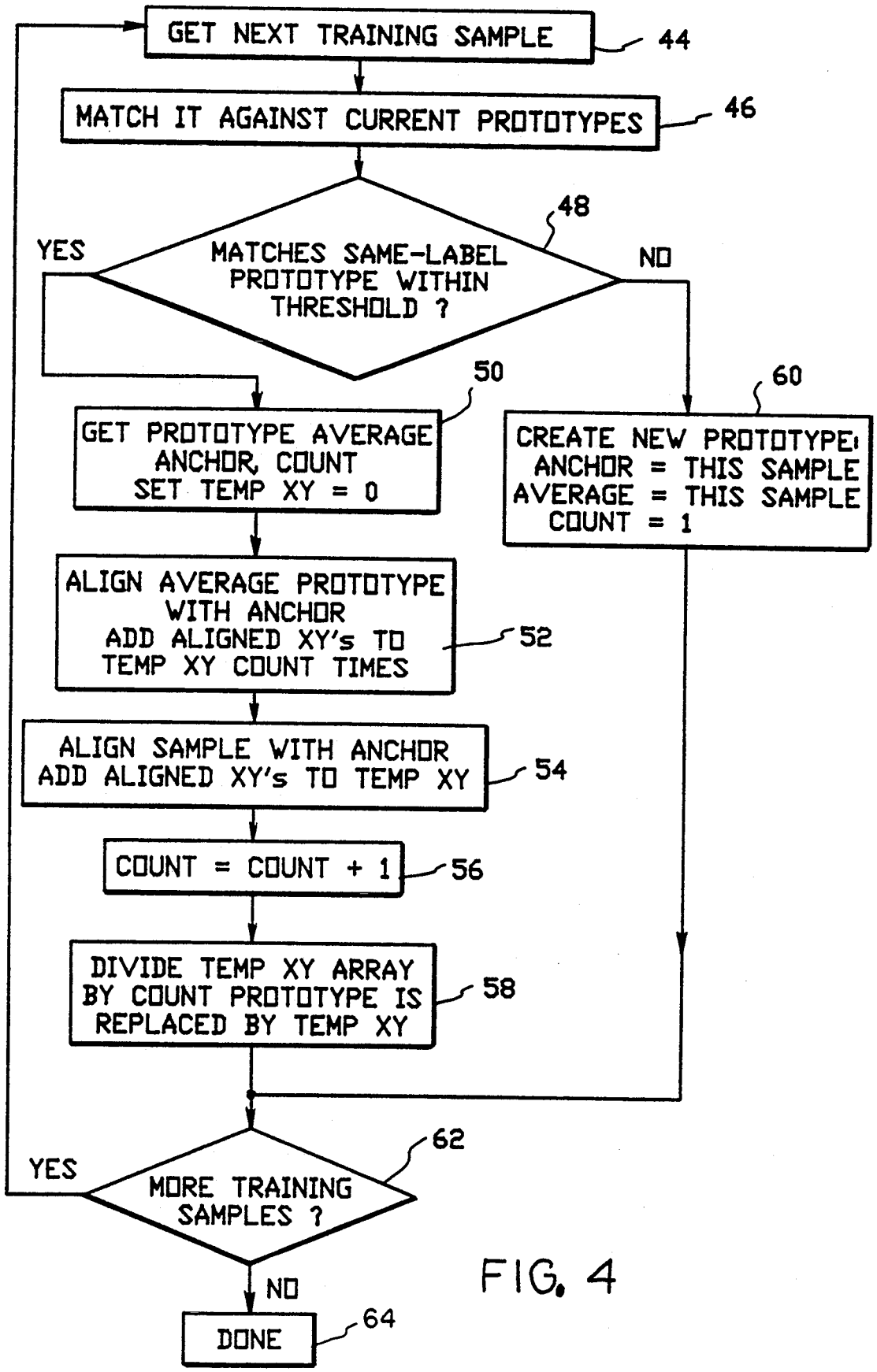
FIG. 4 is a flow chart indicative of how incremental averaging is implemented according to the invention.

For incremental averaging, prototypes are established by processing each training character sequentially in real time. A character creates a new prototype if it is not recognized correctly within a fixed threshold. Otherwise, the character is averaged into the closest prototype of its class. Incremental averaging is performed in prototype processor 24 (FIG. 1) and is flowcharted in FIG. 4. Each character sample is received at block 44 during training, and is matched against the current prototypes at block 46. In decision block 48 a determination is made if the sample matches the same label prototype within a specified threshold. For example if the label prototype is "A", the sample matches if it has the same label, i.e. an "A" within the fixed threshold. If there is a match, the prototype average, anchor and count (of the number of samples in the average) are gotten, and the XY coordinates are initialized to zero in block 50. The average prototype is then aligned with the anchor and the aligned XY's are added to the Temp XY's in block 52. The sample is then aligned with the anchor, and the aligned XY's are added to the Temp XY's in block 54. The count is then incremented by 1 in block 56. The sample XY's are then divided by count to obtain the averaged prototype in block 58.

If at decision block 48 there was not a match, a new prototype, for example "B", is created at block 60, with this prototype initially being the anchor and the average, with a count of 1.

Blocks 58 and 60 each proceed to decision block 62 where a determination is made if there are any more training samples. If there are, a return is made to block 44 to get the sample, and the incremental averaging proceeds as just explained. If there are no more samples, the procedure ends at 64.

The alignment method is now described. One alignment method is "linear alignment", where the character is linearly aligned with the anchor before averaging. Linear alignment is performed by mapping each point of the anchor to the linearly nearest point of the sample character being aligned. Thus, linear alignment is a function of the slope, that is, the ratio of the number of points of the sample character to that of the anchor. The problem with linear alignment is that key points, such as cusps and corners, may not be properly aligned. For example, aligning the anchor (FIG. 2B) with sample 3 (FIG. 2C) misaligns the cusps; the cusp (point 8 of 16) in the anchor linearly maps to point 5 of 10 in sample 3 (FIG. 2C) and not the cusp (point 4). Such misalignment results in poorly defined cusps and corners in the average.

Figures 5, 6:
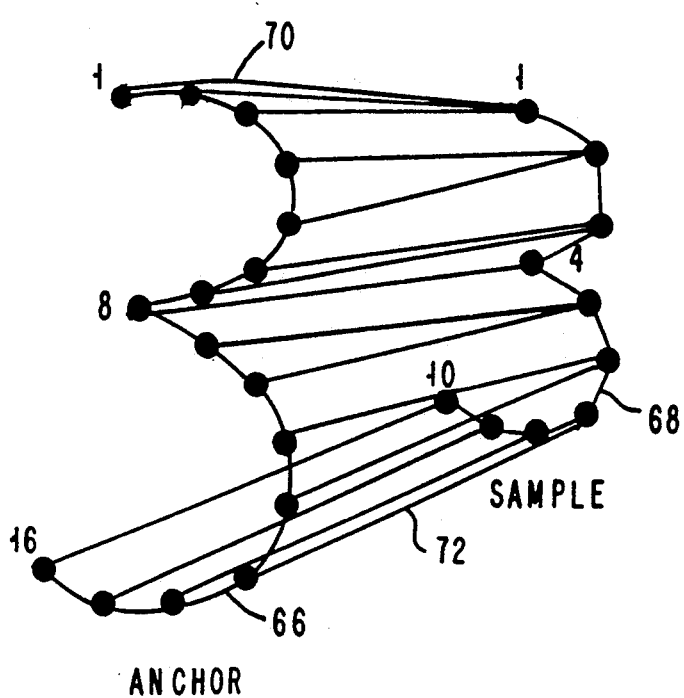
FIG. 5 is a diagram illustrating elastic alignment between a sample character and an anchor character.
FIG. 6 is a table illustrating how points on the anchor character of FIG. 5 maps to points on the sample character of FIG. 5.

A more accurate alignment method is achieved by "elastic alignment", where the character is elastically aligned with the anchor before averaging, as seen with respect to FIGS. 5 and 6. In global averaging, the elastic alignment was performed in blocks 36 and 38 of FIG. 3. In incremental averaging, the elastic alignment was performed in blocks 52 and 54 of FIG. 4. The elastic alignment of a sample with an anchor is not a function of slope as it was for linear alignment. Rather, the alignment of the X, Y points is determined by the "best fit" obtained by the well-known elastic matching algorithm, described in the previously referenced article on "Adaptive Online Handwriting Recognition" by C. C. Tappert. In the literature, the elastic matching algorithm is also referred to as dynamic programming, dynamic time warping, and the Viterbi algorithm. Elastic matching is performed and backpointers maintained (a backpointer is an XY index) to save the alignment. Previously, elastic matching has been used for recognition purposes. That is, determining or recognizing if the sample character is an "A" or a "B". In this invention, recognition has already taken place, and elastic matching is now used to average the sample character with the existing prototype to provide a new average prototype.

In FIG. 5, the anchor of the referenced character 66, and the sample character 68 are shown. A plurality of backpointers aligns coordinate points in the anchor 66 with coordinate points in the sample 68. This is shown in detail in the table of FIG. 6. Two of sixteen such backpointers are shown in FIG. 5, where backpointer 72 maps from point 1 of anchor 66 to point 1 of sample 68, and backpointer 72 maps from point 13 of anchor 66 to point 7 of sample 66. Note that the cusps of the anchor and sample are now properly aligned. For example, the cusp at point 8 of anchor 66 backpoints to the cusp at point 4 of sample 68. This results in a prototype character "3" which is the average of the anchor 66 and the sample 68, and may be implemented to have substantially the same number of sample points as the anchor 66.

Averaging creates prototypes that are usually more regularly shaped or idealized than any of the original character samples. The averaged character shapes are smoothed and most of the irregularities, such as "hooks", are eliminated. The method of elastic alignment for averaging during training is not only accurate but also compatible with the elastic matching of characters during the recognition phase.

INDUSTRIAL APPLICABILITY

It is an object of the invention to provide an improved handwriting recognition system.

It is another object of the invention to provide improved elastic prototype averaging in a handwriting recognition system.

It is yet another object of the invention to provide elastic averaging during prototype establishment in a handwriting recognition system.

It is still another object of the invention to provide elastic averaging during prototype establishment in a handwriting recognition system, where the point-to-point correspondence resulting from an elastic match of two characters is obtained by using backpointers during the calculation of the match.

We claim:

1. A handwriting recognition system comprising:
   a handwriting transducer for measuring the position of a stylus during each of a series of successive time intervals to produce a series of position signals representing the positions;
   a stroke segmenter for identifying a series of position signals corresponding to a discrete handwriting stroke;
   a character prototype store for storing a plurality of character prototype signals, each character prototype signal representing a character; and
   a character matcher for comparing a series of position signals corresponding to a first handwriting stroke with the stored character prototype signals to identify the character prototype signal which is best matched to the first handwriting stroke, and for outputting the best matched character prototype signal as a recognized character;
   wherein the handwriting recognition system further comprises an apparatus for generating character prototype signals comprising:
   means for identifying at least two sampled series of position signals from the stroke segmenter corresponding to handwriting strokes of a given character;
   means for identifying one sampled series of position signals corresponding to the given character as an anchor series based on the number of position signals in the sampled series;
   means for elastically aligning each sampled series of position signals corresponding to the given character with the anchor series of position signals corresponding to the given character; and
   means for averaging the anchor series of position signals corresponding to the given character with each aligned sample series of position signals corresponding to the given character to produce a character prototype signal representing the given character.

2. A handwriting recognition system as claimed in claim 1, further comprising a display for displaying recognized characters output by the character matcher.

3. A handwriting recognition system as claimed in claim 2, characterized in that the anchor series of position signals corresponding to the given character comprises a number of position signals greater than or equal to the number of position signals in all other sampled series of position signals corresponding to the given character.

4. A handwriting recognition system as claimed in claim 2, characterized in that the anchor series of position signals corresponding to the given character comprises a number of position signals approximately equal to the average of the number of position signals in all sampled series of position signals corresponding to the given character.

5. A handwriting recognition method comprising the steps of:

measuring the position of a stylus during each of a series of successive time intervals to produce a series of position signals representing the positions;

identifying a series of position signals corresponding to a discrete handwriting stroke;

storing a plurality of character prototype signals, each character prototype signal representing a character;

comparing a series of position signals corresponding to a first handwriting stroke with the stored character prototype signals to identify the character prototype signal which is best matched to the first handwriting stroke; and outputting the best matched character prototype signal as a recognized character;

wherein the handwriting recognition method further comprises a method of generating character prototype signals comprising the steps of:

identifying at least two sampled series of position signals from the stroke segmenter corresponding to handwriting strokes of a given character;

identifying one sampled series of position signals corresponding to the given character as an anchor series based on the number of position signals in the sampled series;

elastically aligning each sampled series of position signals corresponding to the given character with the anchor series of position signals corresponding to the given character; and averaging the anchor series of position signals corresponding to the given character with each aligned sample series of position signals corresponding to the given character to produce a character prototype signal representing the given character.

6. A handwriting recognition method as claimed in claim 5, further comprising the step of displaying recognized characters output by the character matcher.

7. A handwriting recognition method as claimed in claim 6, characterized in that the anchor series of position signals corresponding to the given character comprises a number of position signals greater than or equal to the number of position signals in all other sampled series of position signals corresponding to the given character.

8. A handwriting recognition method as claimed in claim 6, characterized in that the anchor series of position signals corresponding to the given character comprises a number of position signals approximately equal to the average of the number of position signals in all sampled series of position signals corresponding to the given character.

9. A handwriting recognition system comprising:

a handwriting transducer for measuring the position of a stylus during each of a series of successive time intervals to produce a series of position signals representing the positions;

a stroke segmenter for identifying a series of position signals corresponding to a discrete handwriting stroke;

a character prototype store for storing a plurality of character prototype signals, each character prototype signal representing a character; and a character matcher for comparing a series of position signals corresponding to a first handwriting stroke with the stored character prototype signals to identify the character prototype signal which is best matched to the first handwriting stroke, and for outputting the best matched character prototype signal as a recognized character;

wherein the handwriting recognition system further comprises an apparatus for generating character prototype signals comprising:

means for identifying at least one sampled series of position signals from the stroke segmenter corresponding to a handwriting stroke of a given character;

means for elastically aligning the sampled series of position signals corresponding to the given character with a character prototype signal from the character prototype store representing the given character; and means for averaging the character prototype signal representing the given character with the aligned sample series of position signals corresponding to the given character to produce a new character prototype signal representing the given character.

10. A handwriting recognition system as claimed in claim 9, further comprising a display for displaying recognized characters output by the character matcher.

11. A handwriting recognition method comprising the steps of measuring the position of a stylus during each of a series of successive time intervals to produce a series of position signals representing the positions;

identifying a series of position signals corresponding to a discrete handwriting stroke;

storing a plurality of character prototype signals, each character prototype signal representing a character;

comparing a series of position signals corresponding to a first handwriting stroke with the stored character prototype signals to identify the character prototype signal which is best matched to the first handwriting stroke; and outputting the best matched character prototype signal as a recognized character;

wherein the handwriting recognition method further comprises a method of generating character prototype signals comprising the steps of:

identifying at least one sampled series of position signals from the stroke segmenter corresponding to a handwriting stroke of a given character;

elastically aligning the sampled series of position signals corresponding to the given character with a character prototype signal from the character prototype store representing the given character; and averaging the character prototype signal representing the given character with the aligned sample series of position signals corresponding to the given character to produce a new character prototype signal representing the given character.

12. A handwriting recognition method as claimed in claim 11, further comprising the step of displaying recognized characters output by the character matcher.

* * * * *